United States Patent
Goh et al.

(10) Patent No.: US 7,793,333 B2
(45) Date of Patent: *Sep. 7, 2010

(54) MOBILE AUTHORIZATION USING POLICY BASED ACCESS CONTROL

(75) Inventors: SweeFen Goh, Hartsdale, NY (US); Richard Thomas Goodwin, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 1444 days.

This patent is subject to a terminal disclaimer.

(21) Appl. No.: 11/151,075

(22) Filed: Jun. 13, 2005

(65) Prior Publication Data

US 2006/0282877 A1 Dec. 14, 2006

(51) Int. Cl.
H04L 9/00 (2006.01)

(52) U.S. Cl. .................. 726/1; 726/2; 726/13; 726/14; 726/26; 726/27; 713/100; 713/154; 709/223; 709/224; 709/225; 709/226

(58) Field of Classification Search .............. 726/1, 726/2, 26, 27; 709/223, 225, 226; 707/9
See application file for complete search history.

(56) References Cited

U.S. PATENT DOCUMENTS

| | | | | |
|---|---|---|---|---|
| 6,158,010 | A * | 12/2000 | Moriconi et al. ............... | 726/1 |
| 6,584,454 | B1 | 6/2003 | Hummel et al. | |
| 6,789,202 | B1 * | 9/2004 | Ko et al. ...................... | 726/23 |
| 6,851,113 | B2 | 2/2005 | Hemsath | |
| 6,880,005 | B1 * | 4/2005 | Bell et al. ................... | 709/225 |
| 6,944,183 | B1 * | 9/2005 | Iyer et al. ................... | 370/466 |
| 6,950,825 | B2 | 9/2005 | Chang et al. | |
| 7,051,366 | B1 | 5/2006 | LaMacchia et al. | |
| 7,216,125 | B2 * | 5/2007 | Goodwin ...................... | 707/9 |
| 7,284,000 | B2 * | 10/2007 | Kuehr-McLaren et al. ..... | 707/9 |
| 7,308,706 | B2 * | 12/2007 | Markham et al. ............. | 726/4 |
| 7,328,287 | B1 * | 2/2008 | Arumugham et al. ......... | 710/31 |
| 7,451,201 | B2 * | 11/2008 | Alex et al. .................. | 709/223 |
| 7,506,357 | B1 * | 3/2009 | Moriconi et al. .............. | 726/1 |
| 7,644,432 | B2 * | 1/2010 | Patrick et al. ................ | 726/1 |
| 2004/0064727 | A1 * | 4/2004 | Yadav ........................ | 713/201 |
| 2005/0152270 | A1 * | 7/2005 | Paredes et al. .............. | 370/229 |
| 2005/0251851 | A1 * | 11/2005 | Patrick et al. ................ | 726/1 |
| 2006/0031942 | A1 * | 2/2006 | Jones et al. .................. | 726/27 |

(Continued)

OTHER PUBLICATIONS

Dinesh Verma et al, Policy Based SLA Management in Enterprise Networks, pp. 137-152, Springer- Verlag, 2001.*

(Continued)

*Primary Examiner*—Nasser Moazzami
*Assistant Examiner*—Shanto M Abedin
(74) *Attorney, Agent, or Firm*—Yee & Associates, P.C.; Anne V. Dougherty

(57) ABSTRACT

An authorization engine is provided in a remote device for mobile authorization using policy based access control. To ensure that remote devices can enforce consistent authorization policies even when the devices are not connected to the server, the remote device downloads the relevant authorization policies when the business objects are downloaded and enforces the policies when operations are invoked. The memory footprint of downloadable authorization policies is reduced to fit onto a resource-constrained remote device. A policy evaluation engine interprets and enforces the downloaded policies on the remote device using only the limited computational resources of the remote device.

4 Claims, 7 Drawing Sheets

U.S. PATENT DOCUMENTS

2006/0080733 A1* 4/2006 Khosmood et al. ............ 726/13
2006/0150238 A1* 7/2006 D'Agostino ................... 726/1
2006/0161646 A1* 7/2006 Chene et al. ................ 709/223
2006/0224742 A1* 10/2006 Shahbazi .................... 709/226
2008/0209507 A1* 8/2008 Goh et al. ...................... 726/1

OTHER PUBLICATIONS

USPTO Office action for U.S. Appl. No. 12/116,700 dated Nov. 16, 2009.

* cited by examiner

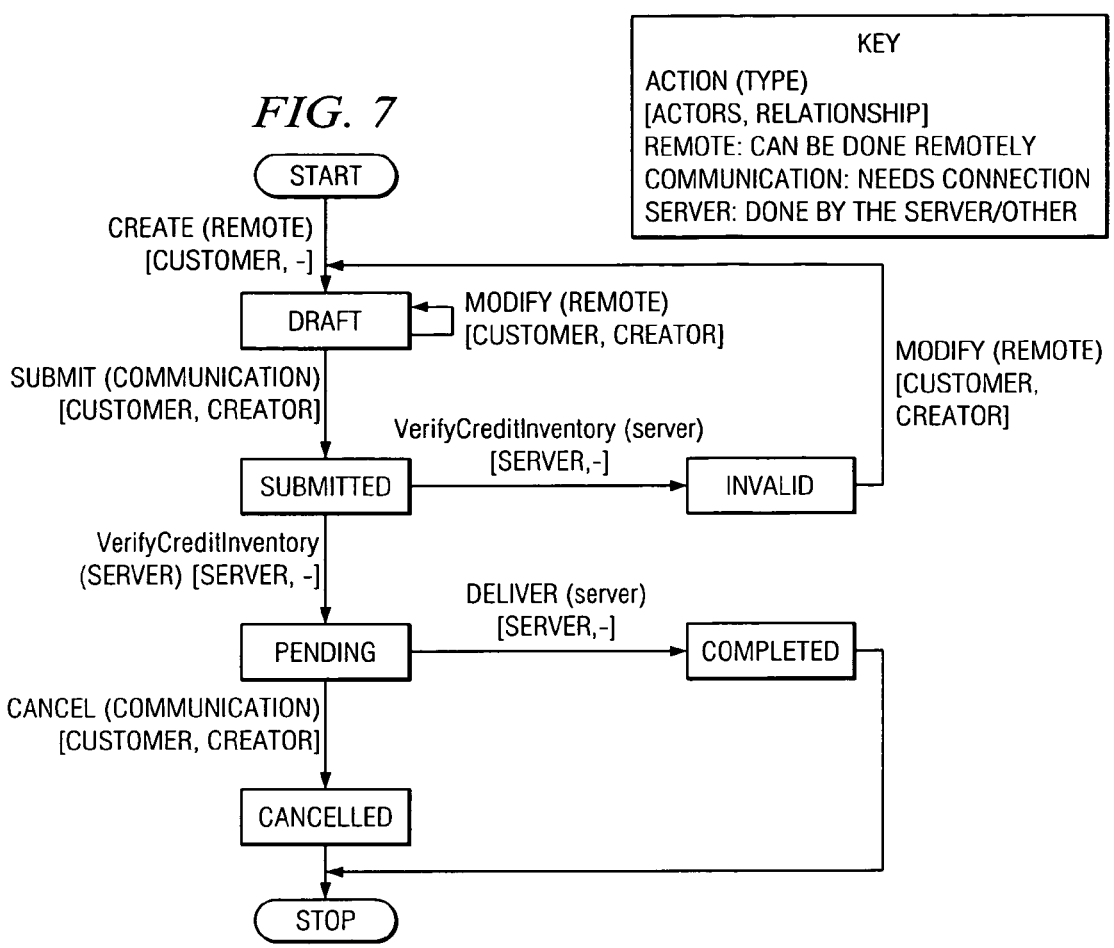

```
reachableStates = { }
For each state in startStates
    reachableStates + = findReachableStates(state) ;
endFor
For each state in each downloaded_resource
    reachableStates + = findReachableStates(state) ;
endFor //Modified Depth First Search
findReachableStates (State s) {
    localReachableStates = { }
    for each neighbor n of s, reachable via a remoteAction {
        if (n is unvisited) {
            localReachableStates + = n;
            localReachableStates + = findReachableStates (n);
        endif
    endfor
endfindReachableStates
```

MOBILE AUTHORIZATION USING POLICY BASED ACCESS CONTROL

BACKGROUND OF THE INVENTION

1. Field of the Invention

The present invention relates to data processing and, in particular, to access control. Still more particularly, the present invention provides a method, apparatus, and computer program product for mobile authorization using policy based access control.

2. Description of the Related Art

Remote access to services over the Internet using mobile and intermittently connected devices is rapidly growing in popularity. Services accessed in this way range from electronic banking to support services for traveling salespeople and from location based services to content based services. Drawbacks of mobile and remote devices include limited bandwidth and sporadic connections. Another drawback of mobile devices is that they tend to be much more resource-constrained than their fixed-line counterparts. Consequently, successful mobile access to services depends on 1) continuous off-line operations when the remote device is disconnected from the network, 2) conformance of off-line operational requirements to the resource constraints of the device, and 3) seamless transition of operations between on-line and off-line states.

To sustain off-line operations, remote devices need to download content and processes. The content may include business objects, such as catalog entries, and business processes, such as order creation, update, and submission. When the required objects and processes are downloaded to the remote device, operations can continue uninterrupted when the device is off-line. When operating in disconnected mode, the same level of authorization allowed on these resources and processes should also be enforced as when operations are performed on-line. Once a remote device is re-connected to the network, seamless transition of operations depends on how well the content and processes can be synchronized with the content and processes on the server.

When a remote device is used to perform off-line operations on downloaded processes and objects, it is possible for the objects and processes to become inconsistent with the corresponding objects and processes on the server. When synchronization is attempted, there may be conflicts. Resolving conflicts can be difficult and time-consuming. Many of these conflicts may be related to the inconsistent enforcement of policy authorization procedures from on-line to off-line operations.

For example, on a remote device without an authorization check, a user cancels a completed order in off-line/disconnected mode. A user may successfully execute the cancel operation on a remote device even though she would not have been permitted to do so on-line. This can arise when there is no authorization check on the remote device. In connected mode, the server would perform an operation authorization check, which would not permit an order that is already completed to be canceled. When the objects and processes corresponding to the off-line operation are synchronized with the server, a conflict occurs from the inconsistency. Conversely, a remote system that did not allow any off-line operations to be performed would not introduce inconsistencies in data, but would introduce inconsistencies in the allowed operations between connected and disconnected operations.

SUMMARY OF THE INVENTION

The present invention recognizes the disadvantages of the prior art and provides mobile authorization using policy based access control. To ensure that the remote devices can enforce consistent authorization policies even when the devices are not connected to the server, the remote device downloads the relevant authorization policies when the business objects are downloaded and enforces the policies when operations are invoked. The memory footprint of downloadable authorization policies is reduced to fit onto a resource-constrained remote device. A policy evaluation engine interprets and enforces the downloaded policies on the remote device using only the limited computational resources of the remote device.

BRIEF DESCRIPTION OF THE DRAWINGS

The invention itself, as well as a preferred mode of use, further objectives and advantages thereof, will best be understood by reference to the following detailed description of an illustrative embodiment when read in conjunction with the accompanying drawings, wherein:

FIG. 7 illustrates an example model of a subset of a state-machine based order process;

FIG. 9 depicts an example modified depth first search algorithm to search all reachable states for all resources downloaded into the remote device.

DETAILED DESCRIPTION OF THE PREFERRED EMBODIMENT

Figure 1:
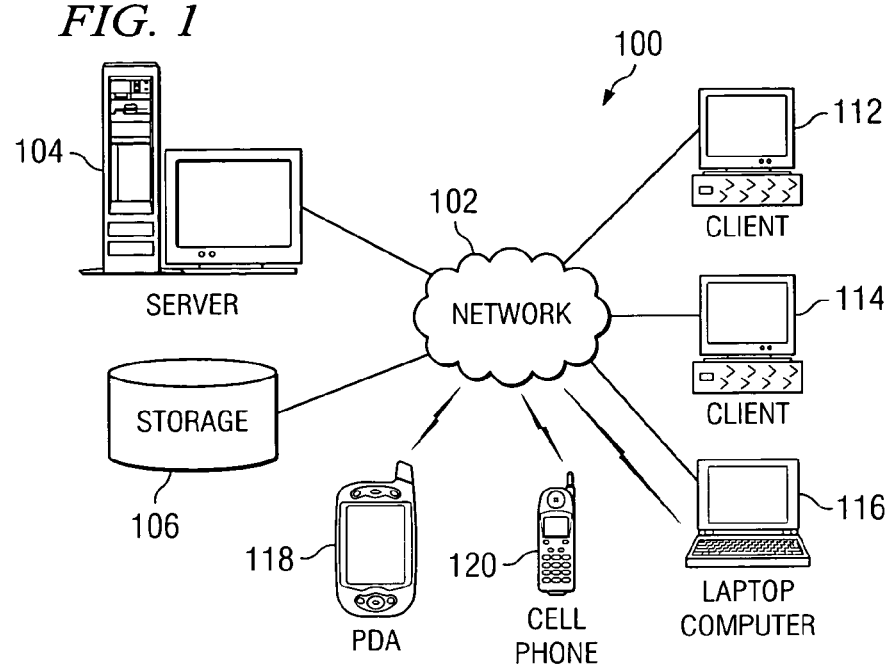
FIG. 1 depicts a pictorial representation of a network of data processing systems in which exemplary aspects of the present invention may be implemented.
Figure 2:
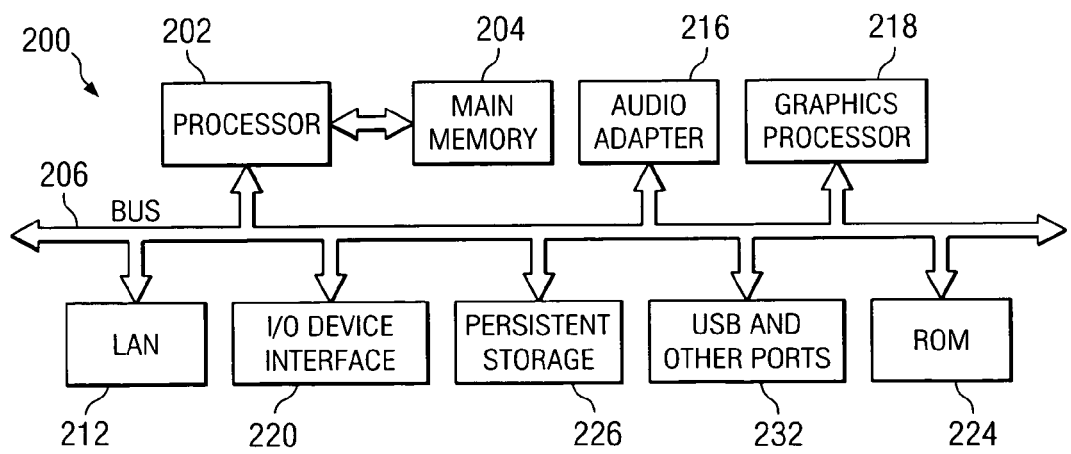
FIG. 2 is a block diagram of a remote device in which the exemplary aspects of the present invention may be implemented.
Figure 3:
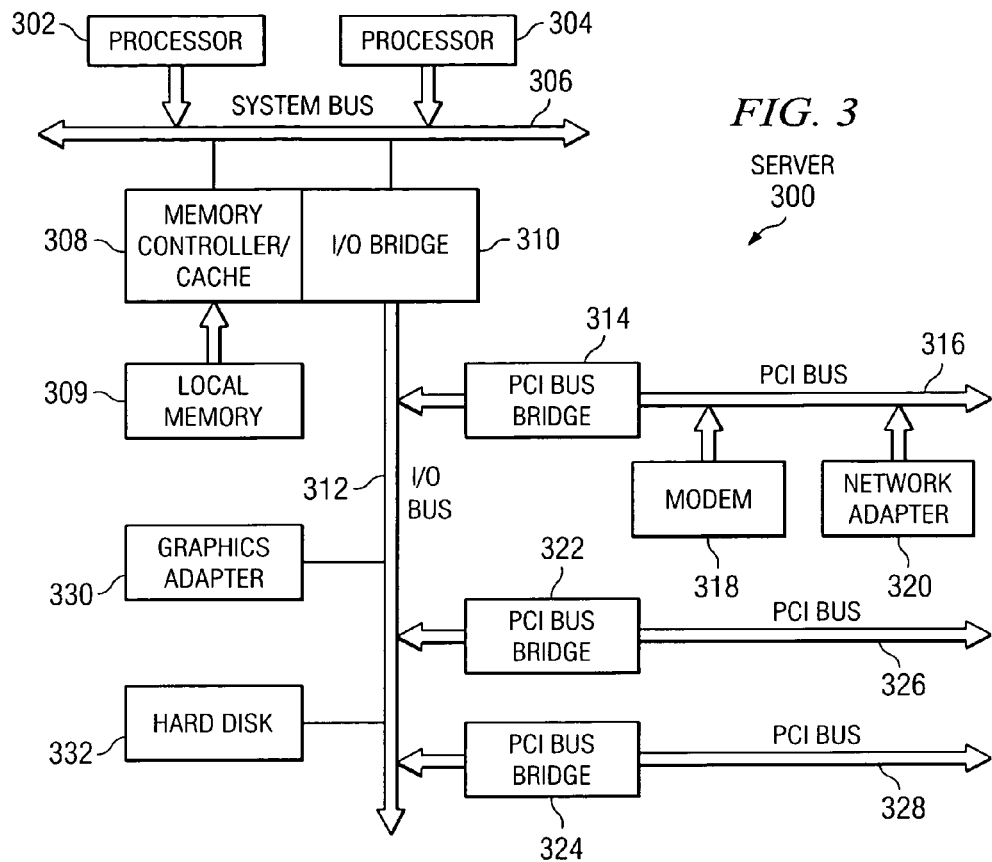
FIG. 3 is a block diagram of a data processing system that may be implemented as a server in accordance with exemplary aspects of the present invention.

A method, apparatus, and computer program product for providing mobile authorization using policy based access control. The following FIGS. 1-3 are provided as exemplary diagrams of data processing environments in which the exemplary aspects of the present invention may be implemented. It should be appreciated that FIGS. 1-3 are only exemplary and are not intended to assert or imply any limitation with regard to the environments in which the exemplary aspects of the present invention may be implemented. Many modifications to the depicted environments may be made without departing from the spirit and scope of the exemplary embodiments described herein.

With reference now to the figures, FIG. 1 depicts a pictorial representation of a network of data processing systems in which exemplary aspects of the present invention may be implemented. Network data processing system 100 is a network of computers in which exemplary aspects of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 112, 114, 116, 118, and 120 are connected to network 102. These clients 112-120 may be, for example, personal computers, network computers, telephone devices, tablet computers, laptop or notebook computers, and the like. In the depicted example, server 104 provides data, such as boot files, operating system images, content files, and applications to clients 112-120. Clients 112-120 are clients to server 104. Network data processing system 100 may include additional servers, clients, and other devices not shown.

More specifically clients 112 and 114 may be stand-alone desktop computers, while client 116 may be a laptop computer, client 118 may be a personal digital assistant (PDA), and client 120 may be a cellular telephone device, for example. Laptop computer 116, PDA 118, and telephone device 120, for instance, may be remote devices, also referred to as mobile devices, which may be portable or moveable. Laptop 116 may be connected to network 102 through wired or wireless communication. A user will typically travel or commute with these devices. As such, devices 116-120 may be used while connected to a network (on-line), such as network 102, or while not connected to a network (off-line).

In the depicted example, network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN), for example. FIG. 1 is intended as an example, and not as an architectural limitation for the present invention.

With reference now to FIG. 2, a block diagram of a remote device is shown in which the exemplary aspects of the present invention may be implemented. Data processing system 200 is an example of a remote device or mobile device, such as a PDA, tablet computer, telephone device, or the like, in which code or instructions implementing the exemplary processes of the present invention may be located. In the depicted example, data processing system 200 employs, for example, a bus architecture including bus 206. Processor 202, audio adapter 2164, and graphics processor 218 are connected to bus 206 in the depicted example. Memory 204 is connected to processor 202.

In the illustrated example, local area network (LAN) adapter 212, I/O device interface 220, persistent storage device 226, universal serial bus (USB) ports and other communications ports 226, read only memory (ROM) 224 may be connected to bus 206. ROM 224 may be, for example, a flash binary input/output system (BIOS). Persistent storage device 226 may be, for example, a hard disk drive or persistent memory device.

An operating system runs on processor 202 and is used to coordinate and provide control of various components within data processing system 200 in FIG. 2. The operating system may be, for example, a commercially available operating system, such as the Palm OS® operating system, which is available from PalmSource, Inc. "PALM OS" is a registered trademark of Palm Trademark Holding Company, LLC. An object oriented programming system, such as the Java™ programming language, may run in conjunction with the operating system and provides calls to the operating system from Java™ programming language programs or applications executing on data processing system 200. "JAVA" is a trademark of Sun Microsystems, Inc. Instructions for the operating system, the object-oriented programming system, and applications or programs are located on storage devices, such as persistent storage 226, and may be loaded into main memory 204 for execution by processor 202. The exemplary processes of the present invention may be performed by processor 202 using computer implemented instructions, which may be located in a memory such as, for example, main memory 204, ROM 224, or in persistent storage device 226.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the exemplary aspects of the present invention may be applied to a multiprocessor data processing system.

Referring to FIG. 3, a block diagram of a data processing system that may be implemented as a server is depicted in accordance with exemplary aspects of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The data processing system depicted in FIG. 3 may be, for example, an IBM eServer™ pSeries® system, a product of International Business Machines Corporation in Armonk, N.Y., running the Advanced Interactive Executive (AIX™) operating system or Linux™ operating system. "LINUX" is a trademark of Linus Torvalds.

When a remote device is used to perform off-line operations on downloaded processes and objects, it is possible for the objects and processes to become inconsistent with the corresponding objects and processes on the server. When synchronization is attempted, there may be conflicts. Resolving conflicts can be difficult and time-consuming. Many of these conflicts may be related to the inconsistent enforcement of policy authorization procedures from on-line to off-line operations.

To reduce the need for conflict resolution, while retaining as much functionality as possible, it is desirable to reduce the possible conflicts that can arise. One approach to doing this may be to ensure that the authorization policies of the server are enforced on the remote device. This may be done in one of two ways: 1) enforcing the authorization policies in the application code loaded onto the remote device, or 2) connecting to an authorization server to determine whether a given access is allowed. The first approach requires recoding of the application every time the authorization policy changes and for each new application. The second approach only works if the authorization server is accessible via the network.

In accordance with exemplary aspects of the present invention, a remote device downloads the relevant authorization policies when the business objects are downloaded and enforces the policies when operations are invoked. In order to implement this approach, however, the memory footprint of downloadable authorization policies must be reduced to fit onto a resource-constrained remote device, like a pervasive device, and a policy evaluation engine must be provided on the remote device to enforce the downloaded policies using only the limited computational resources of the remote device.

Figure 4:
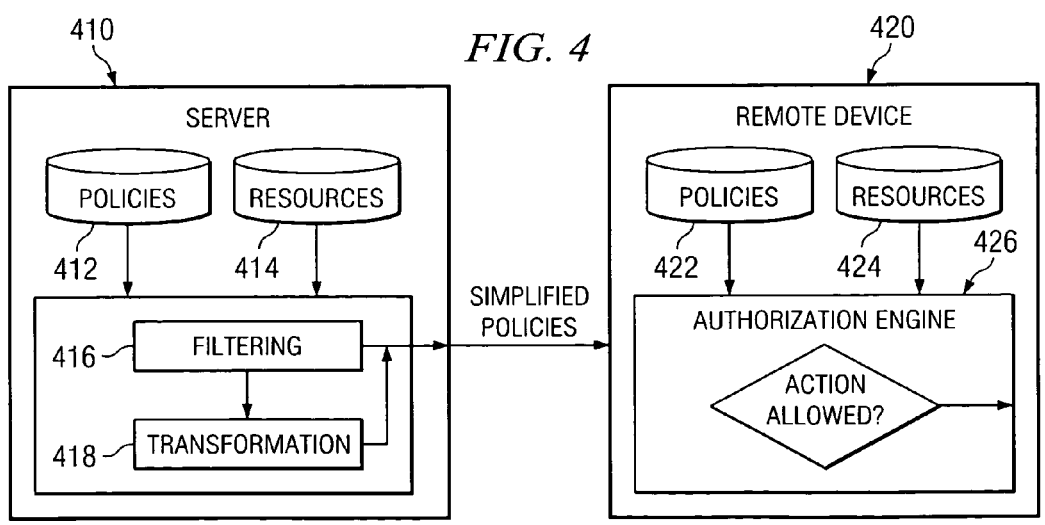
FIG. 4 is a block diagram illustrating the components of a mobile authorization system with policy based access control in accordance with exemplary aspects of the present invention.

FIG. 4 is a block diagram illustrating the components of a mobile authorization system with policy based access control in accordance with exemplary aspects of the present invention. Server 410 provides access to resources 414 and stores polices 412 for the accessing clients. Server 410 includes filtering component 416 and transformation component 418, which generate simplified authorization policies for remote device 420.

Remote device 420 downloads policies 422 and resources 424. Policies 422 are simplified policies for remote device 420, which have a reduced memory footprint. When remote device attempts an operation on one of resources 424, authorization engine 426 interprets and enforces policies 422 and either permits or denies the operation based on policies 422. Authorization engine 426 may make authorization decisions using the limited computational resources of remote device 420.

A policy declares what actions are authorized by whom and on which objects. An example of a possible way of encoding an authorization policy is the following 4-tuple:

[Member Group, Action Group, Resource Group, Relationship]

This 4-tuple form of policy defines "who" (member group) can do what "action" (action group) on what "resource" (resource group). An optional "relationship" in the policy defines the relationship a user must have with respect to the resource. For example, a user can have an "owner," "creator," or "recipient" relationship to a resource, depending on the type of the resource.

Figure 5:
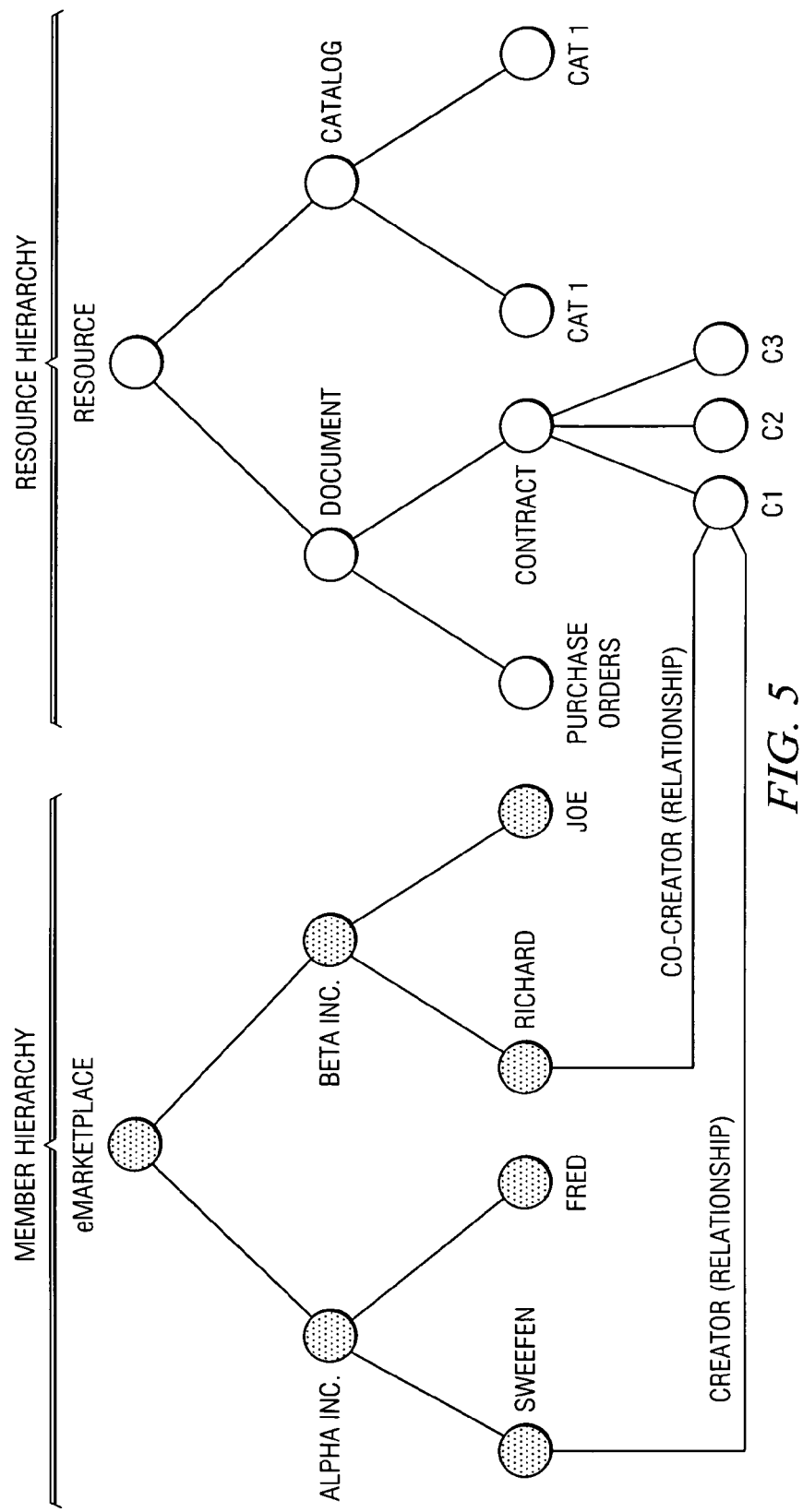
FIG. 5 illustrates an example conceptual model of policies and the resources they govern in accordance with exemplary aspects of the present invention.

FIG. 5 illustrates an example conceptual model of policies and the resources they govern in accordance with exemplary aspects of the present invention. For example, "SweeFen" (member) has a "creator" relationship with resource C1. The member and resource groups can be defined implicitly using a set of constraints the members of the group must satisfy. For instance, a "doctors in New York" member group is defined to be people who have medical licenses and who work in the state of New York. A "pending order" resource group is defined to order objects that are in "pending" state. Groups can also be formed explicitly, simply by enumerating the users or resources in the group.

The policy can be interpreted as granting access to anyone in the member group to perform the given action in the action group on any resource in the resource group, provided the user has the given relationship, if any, with the given object. An example of a policy definition is as follows:

[Manager, Cancel, Order, Owner]

This policy states that all managers (member group) can perform the "cancel" action (action group) on an order (resource group) if the manager also is the owner (relationship) of the order. The implementation of authorization depicted above is used to illustrate the invention; however, the exemplary aspects of the present invention are equally applicable to other types of authorization implementations. For more information on server policy authorization definition and implementation, see R. Goodwin, S. F. Goh, F. Y. Wu, "Instance-level access control for business-to-business electronic commerce," IBM System Journal 41, No. 2, 303-317 (2002), which is herein incorporated by reference.

The policies to be downloaded from the server to the remote device are filtered and transformed to reduce the policies to a minimum amount of information necessary for runtime validation. In addition, policies are transformed so that they do not require information that would not be available when disconnected from the server. In accordance with exemplary aspects of the present invention, mechanisms are provided, shown as filtering component 416 and transformation component 418 in FIG. 4, for example, to filter and perform advanced transformation to produce simplified policy definitions to minimize the amount of validation and authorization check needed off-line in the remote device.

Figure 6:
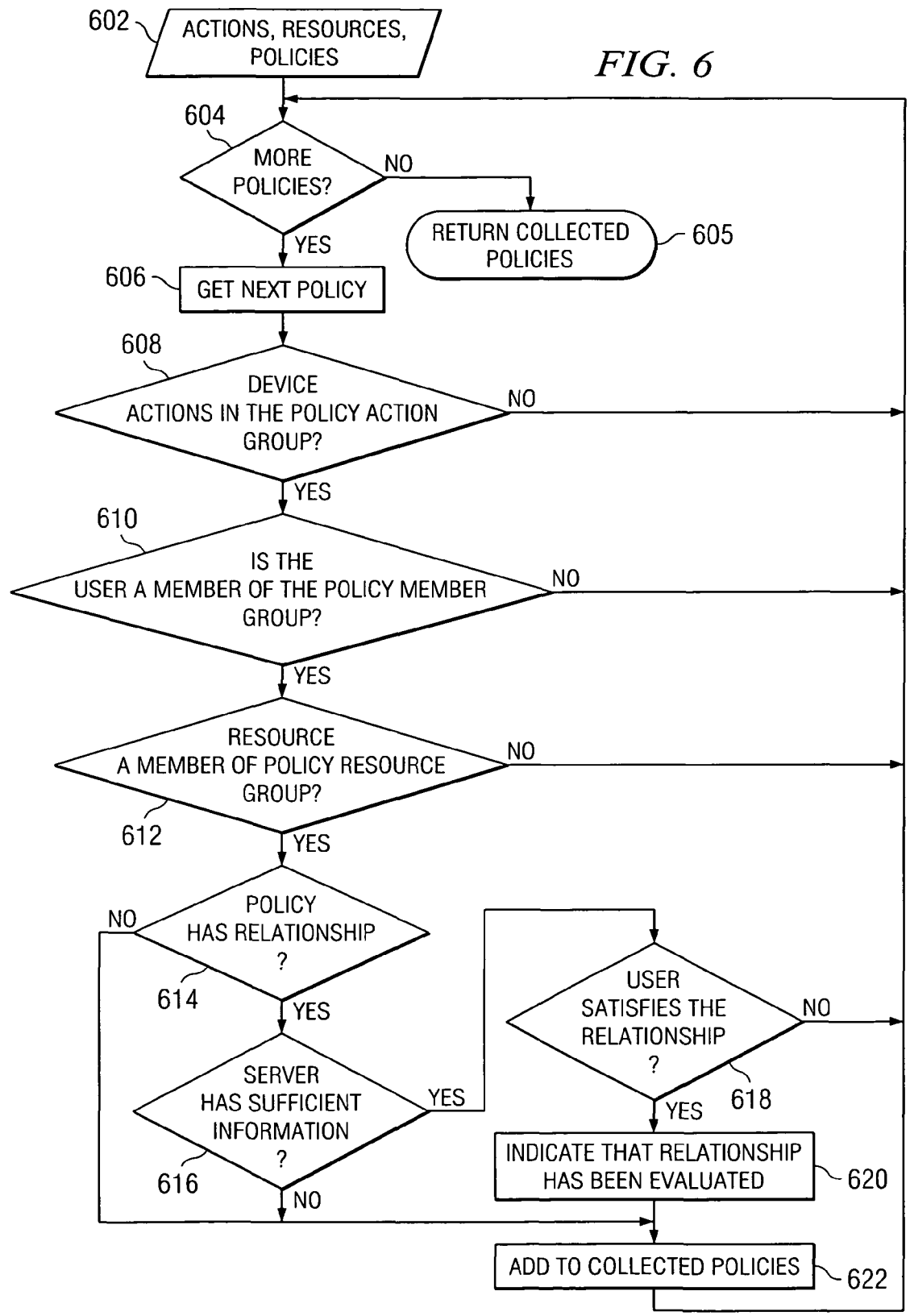
FIG. 6 is a flowchart illustrating filtering and transformation of authorization policies in accordance with exemplary aspects of the present invention.

Given a set of authorization policies, along with information about the users of the remote device, resources downloaded to the remote device, and operations available on the remote device, the authorization policies may be extensively filtered and transformed to minimize communication requirements, as well as memory and runtime processing required on the remote device. FIG. 6 is a flowchart illustrating filtering and transformation of authorization policies in accordance with exemplary aspects of the present invention. The filtering and transformation components receive actions, resources, and policies (block 602) and determine whether more policies are to be returned to the requesting remote device (block 604). If no more policies are to be returned, then the server returns the collected policies (block 605) and operation ends.

If there are more policies to return in block 604, the mechanisms get the next policy (block 606) and determine whether actions available on the remote device are in the policy action group (block 608). The filter mechanism filters out policies that refer to actions that cannot be performed by the remote device. Some operations are physically impossible for the remote device to perform. For example, most remote devices don't have a cash drawer, so dispensing cash is not an action the device can perform. In addition, some operations might not be possible because the code and/or process descriptions needed to perform the action are not downloaded to the device. Thus, if the actions available on the remote device are not in the policy action group, then operation returns to block 604 to determine whether more policies are to be returned to the remote device.

If one or more actions available on the remote device are in the policy action group in block 608, then the mechanisms determine whether the user is a member of the policy member group (block 610). Since the users of the remote device may be known, policies not applicable to these users may be removed. For example, a PDA or telephone device may have only one user. The server may pre-compute the groups of which the user(s) are members and may remove policies that do not refer to these groups.

Additionally, the group definitions in the policies can be simplified. For example, with a device only used by a single person, the membership group check may be eliminated, since only policies applicable to the user of the device will be selected for download. For devices with a small set of users, the groups may be made explicit. For example, the group "New York Doctors," which is defined as people with medical licenses working in New York, might be transformed in the group ["Dr. Smith," "Dr. Jones," "Dr. Johnson"]. The server may do this by computing the intersection between the users of the device and the set of individuals that satisfy the conditions for group membership. This approach has the advantage that access to the information needed to compute group membership, such as the location and medical license status of each user, is not required to do authorization on the remote device.

Even if the identities of the individuals accessing the remote device are not known, the class of individuals might be known. For example, an automatic banking machine is intended only for use by bank customers, so only customer-related authorization policies need to be downloaded to a pervasive device within an automated banking machine, but not policies that refer to tellers.

Returning to block 610, if the user is not a member of the policy member group, then operation returns to block 604 to determine whether more policies are to be returned to the remote device; otherwise, the filtering component determines whether the resource(s) available to the remote device are members of the policy resource group (block 612). Policies can also be filtered based on the set of resources available to the remote device. As with filtering based on the users of the remote device, policies that refer to resources that are not available on the remote device can be removed. One reason resources may not be available is because they cannot be downloaded to the device. For example, a full length movie may not fit on the device. Additionally, resources may not be available, for example, if they are not selected for download.

As with user group filtering, it may be possible to simplify the resource group definitions. A small number of resources could be named explicitly in the group definition. Conditions that all downloaded resources satisfy can be removed from the group definition. For example, if only non-confidential resources are downloaded, then policies that apply only to confidential resources can be filtered out, and the check for non-confidentiality can be removed from the policies.

However, filtering based on members and resources may result in a set of policies that is too restrictive, since only the downloaded resources and current user status are considered. For instance, an implicit resource group, "draft orders," may include any order resources with a status equal to "draft." If it is possible for a user to "submit" the order when operating remotely, the status would change from "draft" to "submitted," and its group membership would change, as would the set of applicable policies. In addition, it may be possible to create new resources on the remote device. For example, if the remote device can be used for order entry, new orders would be created in the draft state. The remote device would need access to the policies for draft orders, even if no draft orders were downloaded.

Returning to block 612, if the resources available to the remote device do not belong to the policy resource group, operation returns to block 604 to determine whether more policies are to be returned to the remote device. However, if the resources available to the remote device do belong to the policy resource group, the mechanisms determine whether the policy has a relationship (block 614). If the policy does not have a relationship, then the mechanisms add the policy to the collected policies (block 622) and operation returns to block 604 to determine whether more policies are to be returned to the remote device. If the policy does have a relationship, then the mechanisms determine whether the server has sufficient information to evaluate the relationship (block 616). If the server does not have sufficient information to evaluate the relationship, then the mechanisms add the policy to the collected policies (block 622) and operation returns to block 604 to determine whether more policies are to be returned to the remote device.

If the server has sufficient information to evaluate the relationship in block 616, then the mechanisms determine whether the user satisfies the relationship (block 618). If the user does not satisfy the relationship, operation returns to block 604 to determine whether more policies are to be returned to the remote device. If the user does satisfy the relationship in block 618, the server indicates that the relationship has been evaluated (block 620) and adds the policy to the collected policies (block 622). Thereafter, operation returns to block 604 to determine whether more policies are to be returned to the remote device.

To refine the set of downloaded policies so that it covers the situations that can arise on the remote device, a reachability analysis is used. The analysis identifies not only the current set of available resources, but also the possible future states of those resources and of resources that could be created on the remote device. In particular, reachability analysis concerns identifying all policies where the conditions to satisfy the policy are reachable on the remote device from the initial set of resources downloaded, given the operations possible on the remote device.

To perform the reachability analysis, a representation of the business processes that can be performed on the remote device is needed. Suitable representations include workflow models and state-machine representations. These may be used to create a directed graph from the current resources to possible future resources. Not all nodes in the graph would be traversed or reached based on initial conditions and available operations. The goal of this step is to reduce the graph into a smaller, reachable sub-graph. If direct access to the underlying business process were unavailable, the graph could be extracted by analyzing the code or by simulating the process and inferring the underlying graph.

Figure 8:
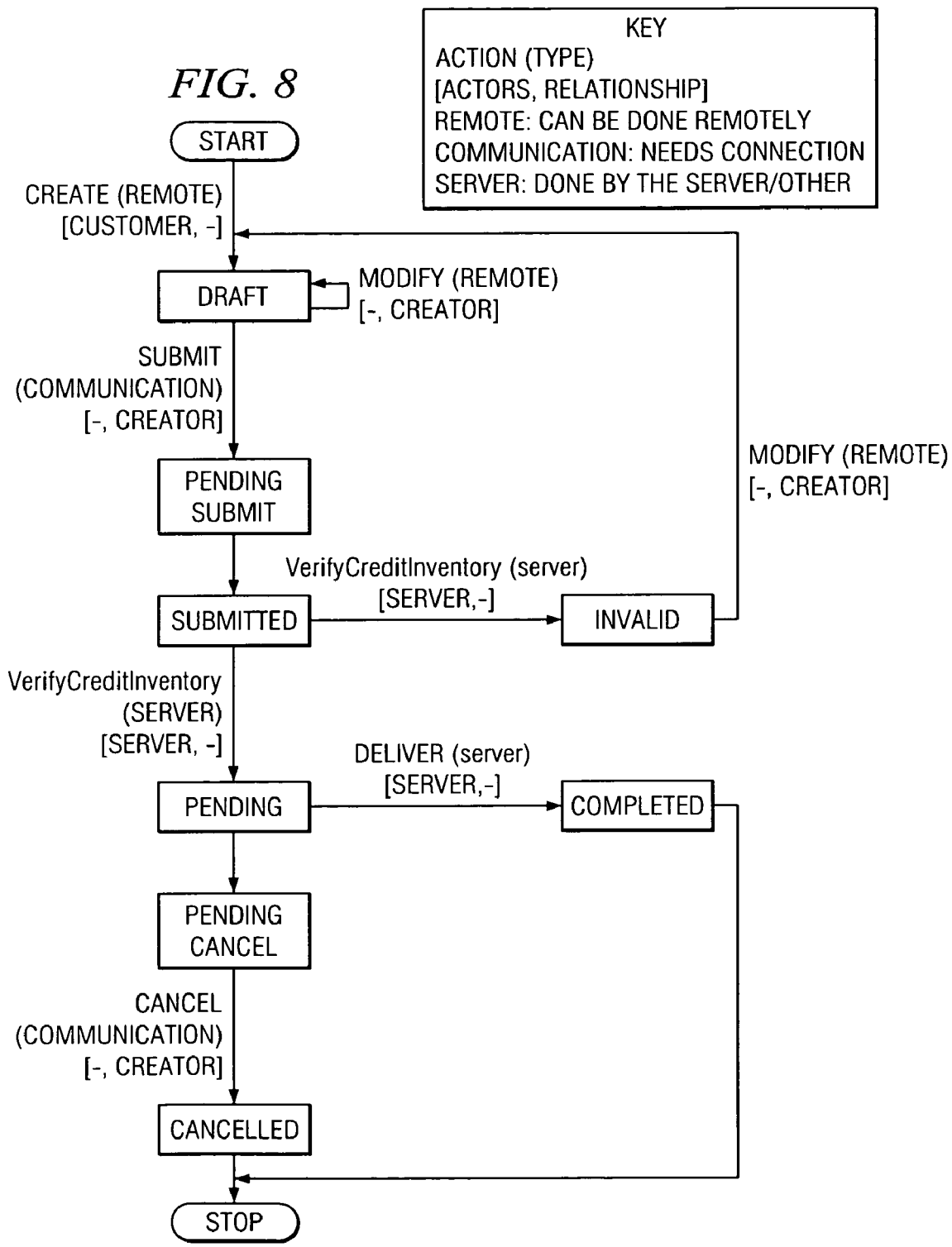
FIG. 8 illustrates an example of a modified form of the model used with remote devices in accordance with exemplary aspects of the present invention.

To illustrate this analysis through an example, FIG. 7 illustrates an example model of a subset of a state-machine based order process. FIG. 8 illustrates an example of a modified form of the model used with remote devices in accordance with exemplary aspects of the present invention. For a more detailed discussion of order processes for mobile electronic business, see J. Sairamesh, S. Goh, I. Stanoi, "Self-Managing, Disconnected Processes and Mechanisms for Mobile E-Business," ACM Mobile Computing 2002 (MobiCom2002), which is herein incorporated by reference. When an order is first created, it is in draft state. On the remote device, the order can be modified by adding and removing items and changing quantities and the delivery address, for example. In connected mode, when the user submits the order, it moves to the submitted state and the server begins verifying the order, doing a credit check, checking inventory, and other order processing steps. In disconnected mode, the draft order is queued up for transmission to the server and is put in the pending submit mode. Note also that in the modified process, one can assume that all the users are customers, so the customer member group check may be removed. The creator relationship check is retained to allow for multiple customers using the same remote device.

In this example, the draft and pending submit states are reachable from the start state, using only actions that can be performed on the remote device. The authorization policies for actions on orders in these states must be downloaded, even if no draft or submit pending orders are currently on the device. However, reaching the pending and invalid states requires communication with the server. These states are only reachable if the remote device has downloaded pending or invalid orders. If a pending order has been downloaded, then the pending cancel state is reachable and the policies that apply to this state must also be downloaded. In addition to changing the state of a resource, remote operations may also change member group memberships and relationships between resources and users. For example, a user may enter a membership of special offer code, adding them to a group that had additional permissions. If this is the case, then these additional states and actions become reachable and the corresponding policies must be included for download.

The reachability analysis may be implemented by any graph traversal algorithms to traverse the state machine graph starting from each start state and each state corresponding to a downloaded resource. FIG. 9 depicts an example modified depth first search algorithm to search all reachable states for all resources downloaded into the remote device. Policies applying to the reachable states and actions that can be performed on the remote device need to be downloaded to the remote device.

A possible simplified policy definition after the filtering and transformation process is showed in the following format:

[policy id, simplified membership group, action name, simplified resource group, simplified relationship group]

The policy id is the policy identification used by server to identify each policy. This id is used locally on the pervasive device for policies synchronization with the server (for general remote object synchronization task). The simplified group definitions are the result of the pre-computation and filtering steps outlined above.

One assumption that is commonly made is that a user's membership status in a group remains constant while the remote devices are operating in disconnect mode. If this were not true, failures would occur when synchronization is performed with the server. Consider a policy that allows only managers to cancel orders, even after they have been completed. If someone cancels a completed order on a remote device, but loses their manager status before synchronizing with the server, then the server will reject the cancellation when it does the group membership check and discovers that the user is not a manager. Another, more practical example of membership change can come from accepting a licensing agreement. For example, a particular piece of media content, such as a picture or video, may only be accessed by people accepting the copyright agreement. If the device allows to user to indicate acceptance, then the user would become a member of the group of people who had agreed to the conditions and should be allowed to see the content. The reachability analysis would have to account for the fact that this locally executable action would change the group membership for the user. In which case, the device should download policies referring to people who have accepted the copyright agreement.

In addition to remote authorization decisions that become invalid because of data synchronization issues, there can be decisions that become invalid because not all data is available to the remote device when disconnected. In such cases, the remote device may take an optimistic or conservative approach to decision making. In an optimistic approach, the missing information is assumed to allow the operation to proceed. It is then verified with the server when the data is synchronized with the server. Consider a case where a remote device is used for order entry and only certain classes of users, such as doctors, for example, are allowed to order particular kinds of goods, like drugs. If the device can be used by a large number of people, the device may not have the information as to which users are doctors and which are not. An optimistic approach would allow anyone to create an order for drugs. When the orders are synchronized with the server, drug orders from non-doctors would be rejected. In the case of access to medical records, a conservative approach may be preferred and only individuals known to be doctors may be granted access. Individuals who are doctors, but whose medical license status is not known to the remote device will be denied access improperly. In such circumstances, the cost of allowing improper access far outweighs the cost of denying valid access. It may also be possible to have a hybrid approach. Combining the two examples above, a device may take an optimistic approach to actions, like drug ordering but take a conservative approach to actions like viewing patient records.

The policies that are downloaded to pervasive devices have already gone through a filtering process and contain the information needed to perform off-line authorization checks on the pervasive devices. The order of the steps outlined below can be changed without affecting the results. The steps can be applied to all policies in parallel or sequentially. For the case where policies only grant access, checking can stop when the first policy granting access is encountered.

Action Group
  Policies for the requested action are selected for verification. If there are no policies for the requested action, the request is denied.
Member Group
  For each policy to be verified, use the user's authentication credentials to check group membership in the simplified member group. This is typically only required for multi-user devices. For single user devices, this check can be done in the filtering stage. Policies for which the user fails the membership check are removed from the verification set.
Resource Group
  For each policy to be verified, check the membership of the resource in the simplified resource group. If the policy applies to all the resources on the remote device, then this step can be skipped as an optimization. Again, policies that fail the check are removed from the verification set.

Relationship Group
  For each policy to be verified, check any relationship requirements. As with the resource group check, this step can be skipped if the relationship holds for all resources on the device or if there are no relationship requirements. Policies that fail this check are removed from the verification set.

If, at the end of the checking, the verification set includes one or more policies that allow access and no policies that deny access, then the access is allowed. Otherwise, access is denied.

Figure 10:
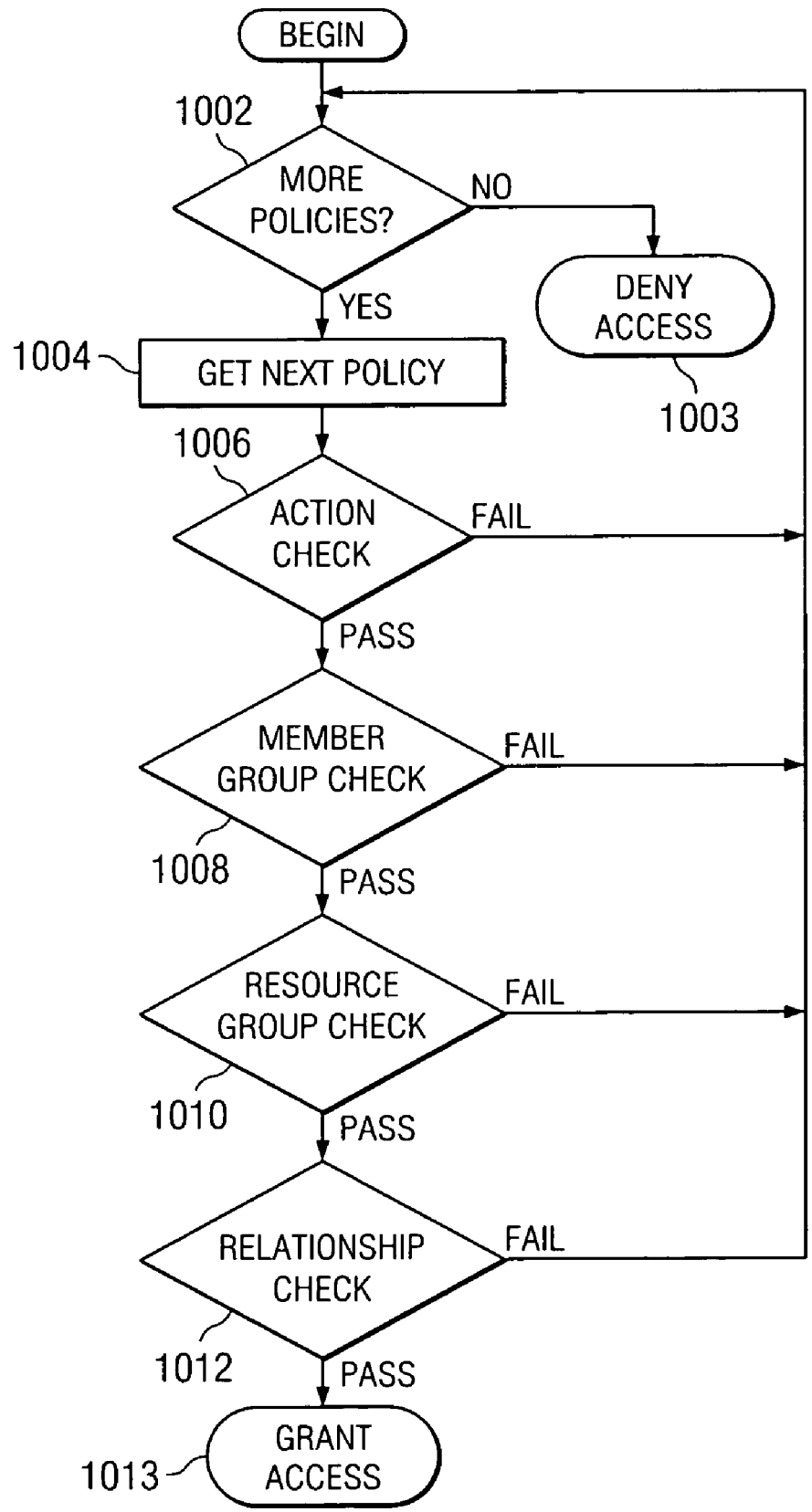
FIG. 10 is a flowchart illustrating the operation of an authorization check to be performed on a remote device in accordance with exemplary aspects of the present invention.

FIG. 10 is a flowchart illustrating the operation of an authorization check to be performed on a remote device in accordance with exemplary aspects of the present invention. During the authorization check on the pervasive device, the simplified policies may refer to attributes of resources that are not downloaded to the pervasive device. For example, a policy may refer to priority orders (resource). The allowed actions may depend on whether an order is a priority order or not. It may also be the case that the order object downloaded to the pervasive device does not include the priority attribute.

The question becomes how to deal with missing information. One approach is to be permissive and allow actions that are not expressively denied. Another approach is to be pessimistic and deny anything that depends on missing information. Both approaches are viable with different tradeoffs. The actions with missing information are captured for later on-line validation. During the synchronization or when a remote device is eventually connected to the server, whether a permissive or pessimistic approach is taken, the validation of missing attribute values can be performed by re-playing the captured actions.

Returning to FIG. 10, operation begins and the remote device determines whether more policies are to be considered (block 1002). If no more policies are to be considered, the remote device denies access (block 1003) and operation ends. If more policies are to be considered in block 1002, the remote device gets the next policy (block 1004) and performs an action check (block 1006). If the action check fails, operation returns to block 1002 to determine whether there are more policies to be considered.

If the action check passes in block 1006, the remote device performs a member group check (block 1008). If the member group check fails, operation returns to block 1002 to determine whether there are more policies to be considered. If the member group check passes in block 1008, the remote device performs a resource group check (block 1010). If the resource group check fails, operation returns to block 1002 to determine whether there are more policies to be considered. If the resource group check passes in block 1010, the remote device performs a relationship check (block 1012). If the relationship check fails in block 1012, operation returns to block 1002 to determine whether there are more policies to be considered. However, if the relationship check passes in block 1012, the remote device grants access (block 1013) and operation ends.

Thus, the exemplary aspects of the present invention solve the disadvantages of the prior art by providing an authorization engine in a remote device for mobile authorization using policy based access control. To ensure that remote devices can enforce consistent authorization policies even when the devices are not connected to the server, the remote device downloads the relevant authorization policies when the business objects are downloaded and enforces the policies when operations are invoked. The memory footprint of downloadable authorization policies is reduced to fit onto a resource-constrained remote device. A policy evaluation engine interprets and enforces the downloaded policies on the remote device using only the limited computational resources of the remote device.

The invention can take the form of an entirely hardware embodiment, an entirely software embodiment or an embodiment containing both hardware and software elements. In one exemplary embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and digital video disk (DVD).

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution. Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for mobile authorization using policy based access control, the method comprising:
  collecting a plurality of policies for a remote device to form a set of collected policies;
  transforming the set of collected policies for the remote device to form a set of simplified policies for the remote device; wherein transforming the set of collected policies comprises:

filtering out any collected policy that includes a policy action group specifying a set of actions if the set of actions is not available on the remote device;

filtering out any collected policy that includes a policy member group if no users within a set of users of the remote device are in the policy member group;

filtering out any collected policy that includes a policy resource group if one or more resources available to the remote device are not members of the policy resource group; and filtering out any collected policy that specifies a relationship between a user and a resource if the user does not have the specified relationship with the resource available to the remote device;

sending the set of simplified policies to the remote device;

receiving the set of simplified policies and one or more resources at the remote device;

responsive to a request to perform an action during an off-line mode at the remote device, checking a current user of the remote device, the one or more resources and the action against the set of simplified policies;

granting the action at the remote device if the current user, the one or more resources and the action passes the check; and denying the action at the remote device if the current user, the one or more resources and the action fails the check.

2. The method of claim 1, wherein each policy in the set of simplified policies is maintained as a 4-tuple encoding that (i) comprises the policy action group, the policy member group, the policy resource group, and the relationship, and (ii) defines who in the policy member group can do what action in the policy action group on what resource in the policy resource group.

3. A data processing system comprising a hardware-implemented processor coupled to a memory, wherein the hardware-implemented processor is operable for executing instructions in the memory to perform steps of:

collecting a plurality of policies for a remote device to form a set of collected policies;

transforming the set of collected policies for the remote device to form a set of simplified policies for the remote device; wherein transforming the set of collected policies comprises:

filtering out any collected policy that includes a policy action group specifying a set of actions if the set of actions is not available on the remote device;

filtering out any collected policy that includes a policy member group if no users within a set of users of the remote device are in the policy member group;

filtering out any collected policy that includes a policy resource group if one or more resources available to the remote device are not members of the policy resource group; and filtering out any collected policy that specifies a relationship between a user and a resource if the user does not have the specified relationship with the resource available to the remote device;

sending the set of simplified policies to the remote device;

receiving the set of simplified policies and one or more resources at the remote device;

responsive to a request to perform an action during an off-line mode at the remote device, checking a current user of the remote device, the one or more resources and the action against the set of simplified policies;

granting the action at the remote device if the current user, the one or more resources and the action passes the check; and denying the action at the remote device if the current user, the one or more resources and the action fails the check.

4. A non-transitory computer-recordable media storing a computer program product for mobile authorization using policy based access control, said computer program product comprising instructions operable by a data processing system for performing the steps of:

collecting a plurality of policies for a remote device to form a set of collected policies;

transforming the set of collected policies for the remote device to form a set of simplified policies for the remote device; wherein transforming the set of collected policies comprises:

filtering out any collected policy that includes a policy action group specifying a set of actions if the set of actions is not available on the remote device;

filtering out any collected policy that includes a policy member group if no users within a set of users of the remote device are in the policy member group;

filtering out any collected policy that includes a policy resource group if one or more resources available to the remote device are not members of the policy resource group; and filtering out any collected policy that specifies a relationship between a user and a resource if the user does not have the specified relationship with the resource available to the remote device;

sending the set of simplified policies to the remote device;

receiving the set of simplified policies and one or more resources at the remote device;

responsive to a request to perform an action during an off-line mode at the remote device, checking a current user of the remote device, the one or more resources and the action against the set of simplified policies;

granting the action at the remote device if the current user, the one or more resources and the action passes the check; and denying the action at the remote device if the current user, the one or more resources and the action fails the check.

* * * * *